US010326906B2

(12) United States Patent
Sato

(10) Patent No.: US 10,326,906 B2
(45) Date of Patent: Jun. 18, 2019

(54) MANAGEMENT APPARATUS AND CONTROL METHOD

(71) Applicant: CANON KABUSHIKI KAISHA, Tokyo (JP)

(72) Inventor: Tetsuya Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/724,071

(22) Filed: Oct. 3, 2017

(65) Prior Publication Data

US 2018/0097968 A1    Apr. 5, 2018

(30) Foreign Application Priority Data

Oct. 5, 2016  (JP) ................................. 2016-197617

(51) Int. Cl.
| | |
|---|---|
| *G06F 3/12* | (2006.01) |
| *H04N 1/333* | (2006.01) |
| *H04N 1/00* | (2006.01) |
| *H04N 1/32* | (2006.01) |
| *H04N 1/327* | (2006.01) |
| *G06K 15/00* | (2006.01) |

(52) U.S. Cl.
CPC ..... *H04N 1/33384* (2013.01); *H04N 1/00042* (2013.01); *H04N 1/00079* (2013.01); *H04N 1/00344* (2013.01); *H04N 1/00896* (2013.01); *H04N 1/32032* (2013.01); *H04N 1/32765* (2013.01); *H04N 1/32786* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,417,128 | B2 * | 4/2013 | Naito .................. | G06F 11/0733 399/8 |
| 2011/0026942 | A1 * | 2/2011 | Naito .................. | G06F 11/0733 399/8 |
| 2014/0025742 | A1 * | 1/2014 | Ukkola ................... | H04W 4/70 709/204 |

FOREIGN PATENT DOCUMENTS

JP        2011-28628 A      2/2011

* cited by examiner

*Primary Examiner* — Dov Popovici
(74) *Attorney, Agent, or Firm* — Canon USA, Inc., IP Division

(57) ABSTRACT

A management server that manages a network device (e.g., an MFP) using NETCONF registers, in the MFP, designation of a condition under which the MFP is to notify the management server of an event, receives, from the MFP, a first notification indicating that a transition is made from a first state in which a session enabling the event notification is established to a second state in which the session needs to be disconnected and a second notification indicating return to the first state, and re-registers the designation of the condition in the MFP in response to reception of the second notification.

11 Claims, 13 Drawing Sheets

FIG.4A

| DEVICE ID | SEVERITY | STATUS | DATE AND TIME OF SUSPENSION | NOTIFICATION DESTINATION |
|---|---|---|---|---|
| D001 | critical | SUSPENDED | 2016/6/15 14:51 | aaa@sample.co.jp |
| D002 | major | SUBSCRIBING | | bbb@sample.co.jp |

FIG.4B

| DEVICE ID | DEVICE NAME | IP ADDRESS |
|---|---|---|
| D001 | DEVICE 1 | 192.168.yy.yy |
| D002 | DEVICE 2 | 192.168.zz.zz |
| D003 | DEVICE 3 | 192.168.ww.ww |

FIG.4C

| EVENT ID | DATE AND TIME OF OCCURRENCE | EVENT CLASS | SEVERITY | EVENT |
|---|---|---|---|---|
| E001 | 2016/6/15 13:51 | Fault | critical | DRUM_ERROR |
| E002 | 2016/6/15 14:20 | Fault | major | TONER_EMPTY |
| E003 | 2016/6/15 14:51 | State | | SLEEP |
| E004 | 2016/6/15 15:15 | State | | AVAILABLE |
| E005 | 2016/6/15 15:17 | Fault | minor | COVER_OPEN |
| ... | ... | ... | ... | ... |

FIG.4D

| NOTIFICATION CONDITION ID | SEVERITY | STATE CHANGE | NOTIFICATION DESTINATION |
|---|---|---|---|
| N0001 | critical | sleep, shutdown | 192.168.xxx.xx |

FIG.8

```
<?xml version="1.0" encoding="utf-8" ?>
<netconf:rpc message-id="100" xmlns:netconf="xxx">
    <create-subscription>
        <filter netconf:type="subtree">
        <event>
            <eventClass>fault</eventClass>
            <severity>critical</severity>
        </event>
        <event>
            <eventClass>state</eventClass>
            <operState>shutdown</operState>
        </event>
        <event>
            <eventClass>state</eventClass>
            <operState>sleep</operState>
        </event>
        </filter>
    </create-subscription>
</netconf:rpc>
```

800

801 — <filter netconf:type="subtree">
802 — <event> (fault/critical)
803 — <event> (state/shutdown)
804 — <event> (state/sleep)

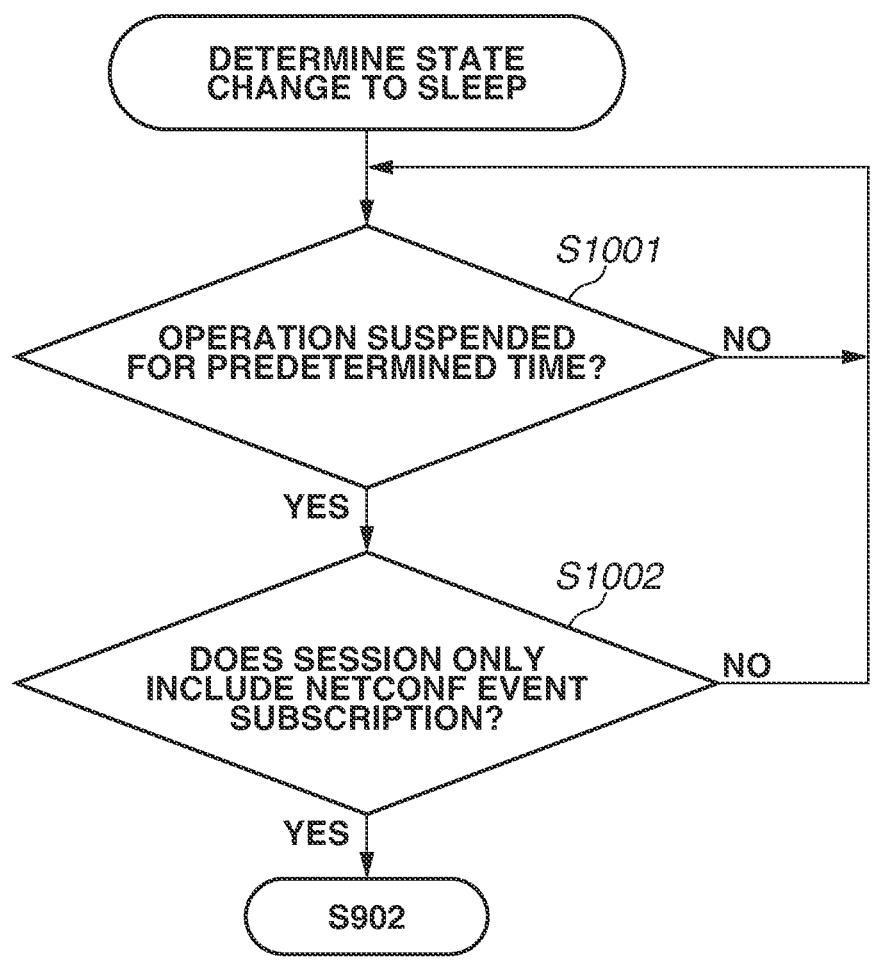

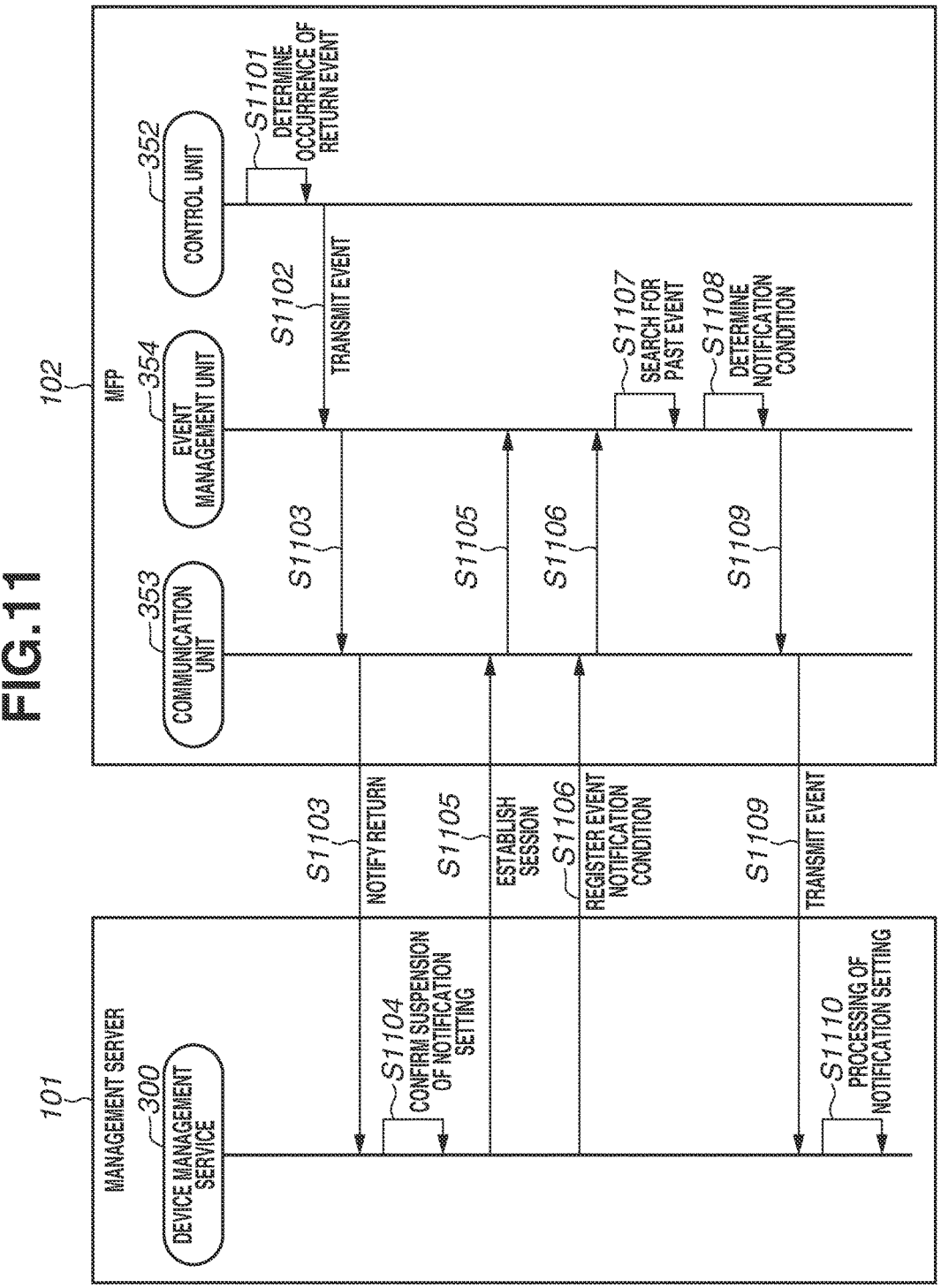

FIG.12

```
<?xml version="1.0" encoding="utf-8" ?>
<netconf:rpc message-id="100" xmlns:netconf="xxx">
    <create-subscription>
        <startTime>2016/6/15  14:51:30</startTime>~1201
        <filter netconf:type="subtree">
         <event>
           <eventClass>fault</eventClass>
           <severity>critical</severity>
         </event>
         <event>
           <eventClass>state</eventClass>
           <operState>sleep</operState>
         </event>
         <event>
           <eventClass>state</eventClass>
           <operState>shutdown</operState>
         </event>
        </filter>
    </create-subscription>
</netconf:rpc>
```

MANAGEMENT APPARATUS AND CONTROL METHOD

BACKGROUND OF THE INVENTION

Field of the Invention

The present invention relates to a technique for managing a network device.

Description of the Related Art

There is a system that manages a network device such as a router, a computer, and a multifunction peripheral (MFP). In such a system, a management server receives an event such as occurrence of a failure or a state transition from the network device, and performs processing such as sending a mail to an administrator according to the received event. Examples of the methods for the network device to notify an event include the simple network management protocol (SNMP) trap and the network configuration protocol (NETCONF).

SNMP is a protocol for monitoring and controlling a device via a network. The SNMP trap is a function with which a network device to be managed notifies a management server, which manages the network device, of an event that has occurred. In SNMP, data is generally transmitted using the user datagram protocol (UDP), and there is no guarantee that the data would reach the destination. Also in the SNMP trap, therefore, there is no guarantee that the event would reach the destination.

NETCONF is a protocol that is being standardized by the Internet Engineering Task Force (IETF). In NETCONF, data is exchanged between a device and a management server using Extensible Markup Language (XML). In addition, NETCONF stipulates that data is sent after a connection-oriented session is established using the transmission control protocol (TCP) or the like rather than UDP. Therefore, it is possible to achieve highly reliable event notification with a guarantee that an event would reach the destination.

Meanwhile, a device such as an MFP may not be able to maintain a session with the management server due to power off caused by shutdown or a state transition to a power saving mode such as a sleep mode. In such a case, the device cannot continue the event notification, and the management server may not receive all the necessary events to be received.

Japanese Patent Application Laid-Open No. 2011-28628 discusses a technique with which an image forming apparatus spontaneously notifies a monitoring apparatus of state information, and the monitoring apparatus acquires the state information also by periodically acquiring information (polling).

However, in acquiring an event by polling of the management server, depending on the timing, a transition to a state in which the network device cannot notify the event may be detected belatedly.

SUMMARY OF THE INVENTION

The present invention is directed to managing an event that has occurred in a network device while a session between the network device and a management apparatus is suspended, even in a case where the network device transitions to a state requiring such suspension.

In view of the above, a management apparatus that manages a network device using a predetermined protocol via a network includes a memory storing instructions, and a processor which is capable of executing the instructions causing the management apparatus to register, in the network device, designation of a condition under which the network device is to notify the management apparatus of an event, receive, from the network device, a first notification indicating that a state of the network device transitions from a first state in which a session enabling the event notification between the network device and the management apparatus is established to a second state in which the session needs to be disconnected, receive, from the network device, a second notification indicating that the state of the network device returns to the first state, and re-register the designation of the condition in the network device in response to reception of the second notification.

Further features of the present invention will become apparent from the following description of exemplary embodiments with reference to the attached drawings.

BRIEF DESCRIPTION OF THE DRAWINGS

FIGS. 4A, 4B, 4C, and 4D are diagrams illustrating configurations of tables managed by the management server and the MFP.

FIG. 8 is a diagram illustrating a display example of registered contents of the event subscription.

FIG. 10 is a flowchart illustrating processing of determining a state transition to a sleep mode of the MFP.

FIG. 11 is a diagram illustrating processing at the time of a transition to a state in which a session can be established.

FIG. 12 is a diagram illustrating a display example of registered contents at the time of reregistering the event subscription.

DESCRIPTION OF THE EMBODIMENTS

Exemplary embodiments of the present invention will be described below with reference to the drawings.

System Configuration

Figure 1:
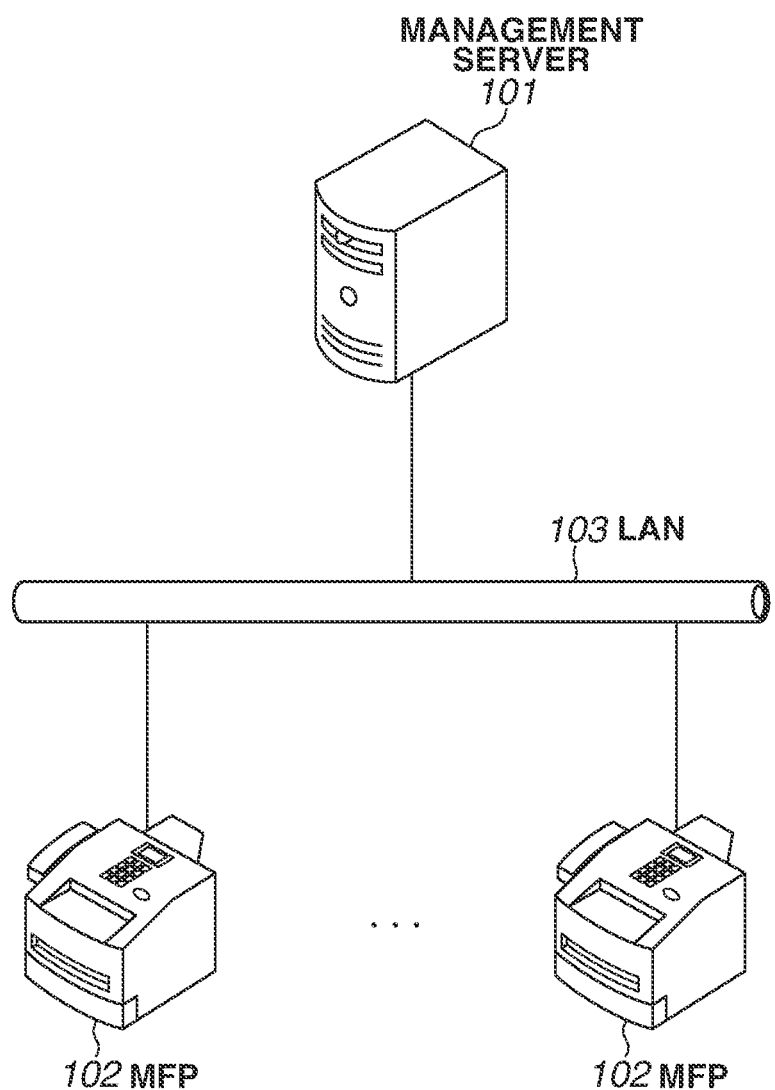
FIG. 1 is a diagram illustrating an example of a system configuration according to an exemplary embodiment of the present invention.

A first exemplary embodiment will be described below. FIG. 1 is a diagram illustrating an example of a system configuration according to the present exemplary embodiment.

A management server 101 functions as a management apparatus of a network device. The management server 101 is connected to the network device via a local area network (LAN) 103. A device management service to be described below is running in the management server 101, and the management server 101 receives an event that has occurred in the network device using the network configuration protocol (NETCONF).

In the present exemplary embodiment, the management server 101 receives an event from the network device using the NETCONF protocol, but the present invention is not limited to this example. The protocol used by the management server 101 is a predetermined protocol, and defines, for example, a request for controlling a setting operation using a plurality of datastores (areas) that manage setting information secured by the network device.

The plurality of datastores in NETCONF includes, in addition to a running datastore, at least one of a candidate datastore and a startup datastore. The running datastore is an area that holds the current setting data and is an active datastore on the device.

The candidate datastore is an area that temporarily holds setting data and is an inactive datastore that can be operated without affecting the current configuration of the device defined by NETCONF. The startup datastore is an area that holds setting data to be reflected at the time of activating the device. The running datastore is essential for the specification of NETCONF. The candidate and startup datastores are optional for the specification.

In the present exemplary embodiment, a multifunction peripheral (MFP) 102 is used as an example of the network device, but the network device is not limited to an MFP. Examples of the network device may include devices such as a printer, a scanner, a network relay device (router), and a network camera. The MFP 102 supports the NETCONF protocol, and transmits an event that has occurred in the MFP 102 to another device. Details of the processing of the management server 101 and the MFP 102 using the NETCONF protocol will be described below with reference to FIG. 6.

Hardware Configuration of Management Server

Figure 2A:
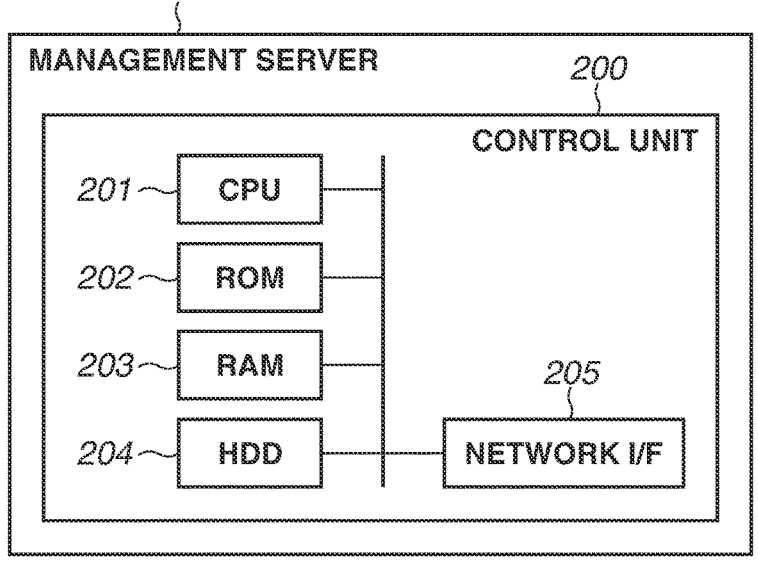
FIGS. 2A and 2B are diagrams illustrating respective hardware configurations of a management server and a multifunction peripheral (MFP).

FIG. 2A is a block diagram illustrating an example of a hardware configuration of the management server 101. A control unit 200 including a central processing unit (CPU) 201 controls the operation of the entire management server 101. The CPU 201 reads a control program stored in a read only memory (ROM) 202 and executes various control processing.

A random access memory (RAM) 203 is a main memory of the CPU 201, and is used as a temporary storage area such as a work area. A hard disk drive (HDD) 204 stores image data, various programs, and various information tables described below. A network interface (I/F) 205 connects the control unit 200 to the LAN. The network I/F 205 transmits and receives various kinds of information to/from other devices via a network.

Hardware Configuration of MFP

Figure 2B:
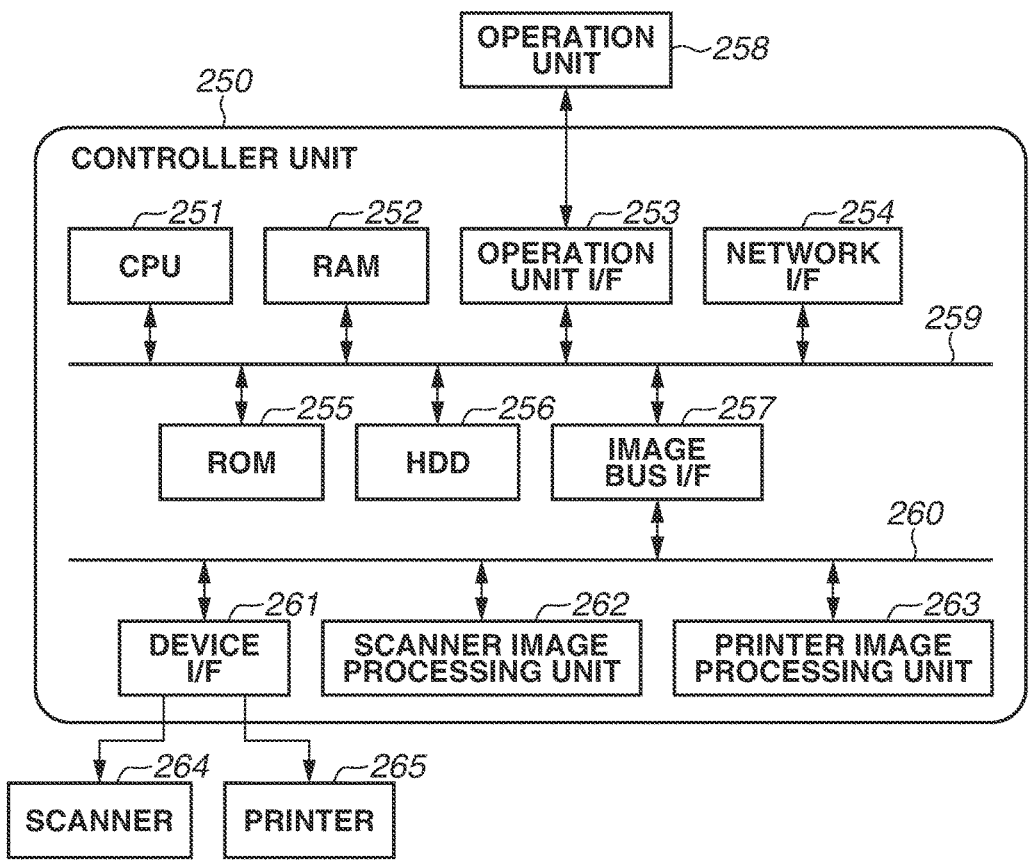

FIG. 2B is a block diagram illustrating an example of a hardware configuration of the MFP 102.

The MFP 102 includes a controller unit 250, an operation unit 258, a scanner 264 as an image input device, and a printer 265 as an image output device. The controller unit 250 is connected to the scanner 264, the printer 265, and the operation unit 258.

The controller unit 250 performs control for realizing a copy function of printing and outputting, by the printer 265, image data read by the scanner 264. The controller unit 250 includes a CPU 251 as a processor. The CPU 251 starts up an operation system (OS) by a boot program stored in a ROM 255. The CPU 251 executes various processing by executing a program stored in an HDD 256 on the OS.

A RAM 252 is used as a work area of the CPU 251. The RAM 252 provides a work area and an image memory area for temporarily storing image data. The HDD 256 stores programs and image data. The CPU 251 is connected to the ROM 255, the RAM 252, and an operation unit I/F 253 via a system bus 259. The CPU 251 is further connected to a network I/F 254 and an image bus I/F 257.

The operation unit I/F 253 is an interface of the operation unit 258 having a touch panel, and outputs, to the operation unit 258, image data to be displayed on the operation unit 258. Furthermore, the operation unit I/F 253 transmits, to the CPU 251, information input by a user in the operation unit 258. The network I/F 254 is an interface for connecting the MFP 102 to the LAN. The image bus I/F 257 is a bus bridge for connecting the system bus 259 and an image bus 260 that transfers image data at a high speed, and for converting the data format. The image bus 260 includes a peripheral component interconnect (PCI) bus or an IEEE 1394 bus, for example.

A device I/F 261, a scanner image processing unit 262, and a printer image processing unit 263 are provided on the image bus 260. The scanner 264 and the printer 265 are connected to the device I/F 261. The device I/F 261 performs synchronous/asynchronous conversion of image data. The scanner image processing unit 262 corrects, processes, and edits the input image data. The printer image processing unit 263 performs correction or resolution conversion on the image data to be printed out according to the printer 265.

Software Configuration of Management Server

Figure 3A:
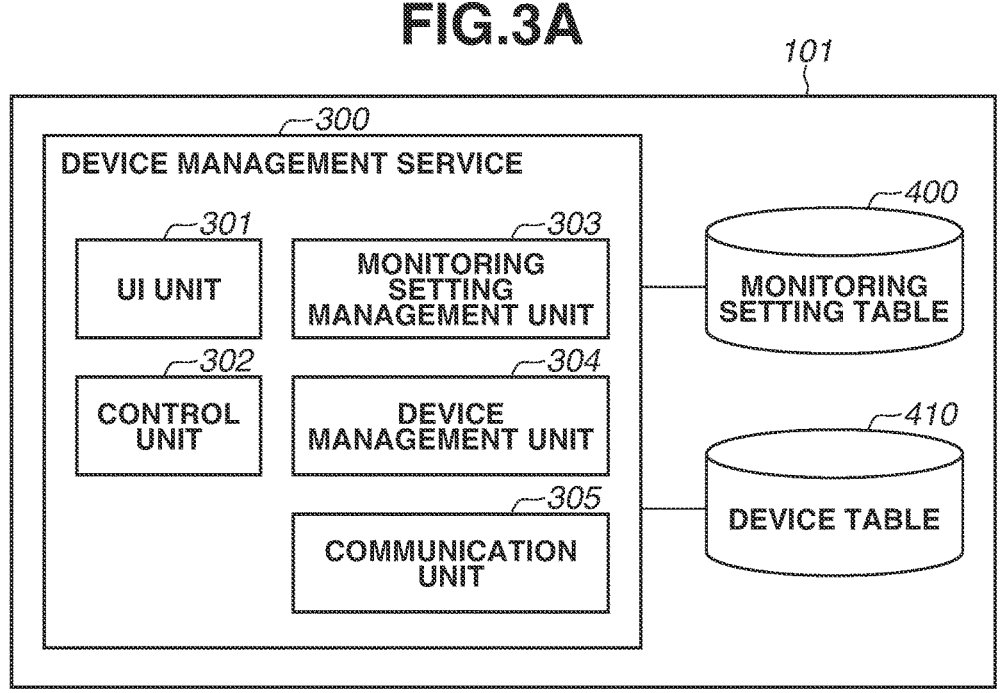
FIGS. 3A and 3B are diagrams illustrating respective software configurations of the management server and the MFP.

FIG. 3A is a diagram illustrating an example of a software configuration of the management server 101.

In the management server 101, a device management service 300 operates. The device management service 300 is a service that receives an event of the MFP 102 using NETCONF and manages the device by performing processing according to the received event.

The device management service 300 is a program stored in the HDD 204 included in the management server 101. The CPU 201 realizes various functions by reading the program of the device management service 300 into the RAM 203 and executing the program. The device management service 300 manages a monitoring setting table 400 and a device table 410, which will be described below with reference to FIG. 4.

The device management service 300 includes a user interface (UI) unit 301, a control unit 302, a monitoring setting management unit 303, a device management unit 304, and a communication unit 305. The UI unit 301 is a software module that creates a HyperText Markup Language (HTML) document in response to a page acquisition request or the like received from a web browser via the communication unit 305. The control unit 302 is a software module that accepts a request from the UI unit 301 and the communication unit 305 and instructs the monitoring setting management unit 303, the device management unit 304, and the communication unit 305 to perform processing.

The monitoring setting management unit 303 manages a monitoring setting stored in the monitoring setting table 400.

The monitoring setting includes, for example, a setting about which event that has occurred in the MFP 102 is to be monitored using NETCONF, and a setting about a notification destination that is notified of an event monitored using the NETCONF in a case where the event is received. The device management unit 304 manages device information stored in the device table 410. The device information includes information such as an Internet protocol (IP) address of the MFP 102. The communication unit 305 is a software module that registers, in the MFP 102, event subscription by NETCONF, and receives an event notified from the MFP 102.

Software Configuration of MFP

Figure 3B:
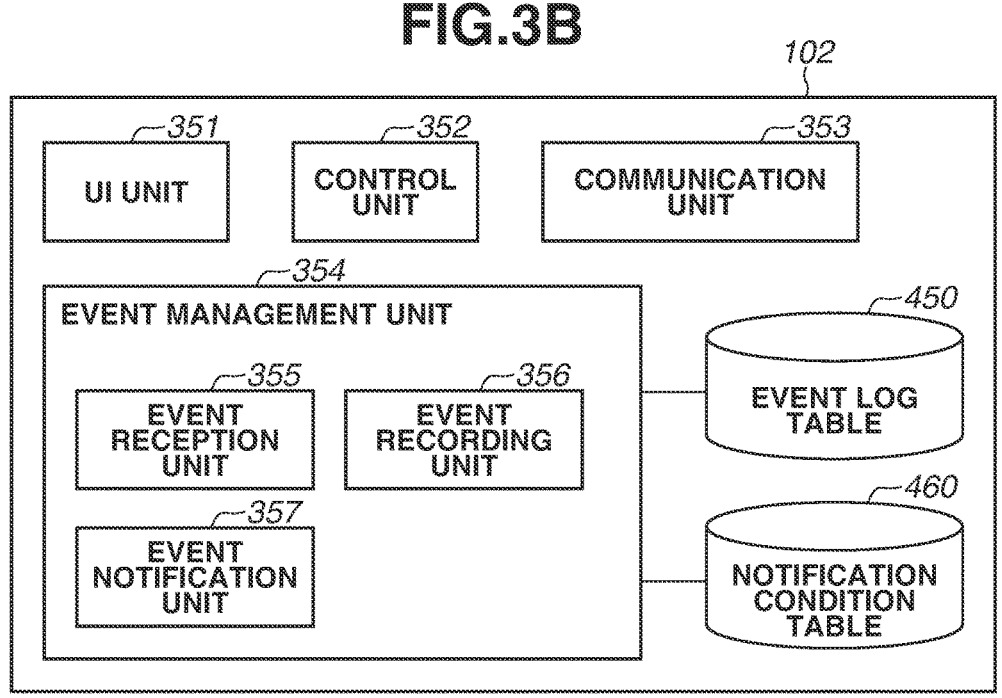

FIG. 3B is a diagram illustrating an example of a software configuration of the MFP 102.

The MFP 102 includes a UI unit 351, a control unit 352, a communication unit 353, and an event management unit 354. The functions of these units are realized by the CPU 251 reading the program stored in the HDD 256 of the MFP 102 into the RAM 252 and executing the program.

The UI unit 351 is a software module that displays a UI for accepting execution of various functions of the MFP 102 such as copying. The UI unit 351 displays a UI for accepting shutdown of the MFP 102. The control unit 352 is a software module that accepts a request from the UI unit 351 and the communication unit 353 and instructs each unit to perform processing. Furthermore, the control unit 352 determines a state transition (state change) of the MFP 102 such as shutdown or sleep. The state transition determination processing will be described below with reference to FIGS. 9 and 10.

The communication unit 353 is a software module that accepts registration of event subscription by NETCONF and notifies an event that has occurred in the MFP 102. The event management unit 354 manages an event log table 450 and a notification condition table 460, which will be described below with reference to FIG. 4. The event management unit 354 is a software module including an event reception unit 355, an event recording unit 356, and an event notification unit 357. The event reception unit 355 is a software module that receives an event such as occurrence of a failure or a state transition of the MFP 102 from the control unit 352 and other applications of the MFP 102.

The event recording unit 356 is a software module that writes event information in the event log table 450. The event notification unit 357 is a software module that manages notification conditions stored in the notification condition table 460. Based on the notification condition table 460, the event notification unit 357 determines whether to notify the management server 101 of the event received from the event reception unit 355 or the event recording unit 356.

Table Configuration

FIG. 4A is an example of a monitoring setting table managed by the device management service 300 of the management server 101.

The monitoring setting table 400 is a table that manages information about registration of event subscription in each MFP 102 and a notification destination to be notified of an event when the event is received. The monitoring setting table 400 includes columns 401 to 405.

One record represents one monitoring setting. The column 401 represents a device identification (ID). The device ID is an identifier for uniquely identifying the MFP 102, and represents the MFP 102 to be monitored. The column 402 represents severity, and indicates what failure event is to be monitored. For example, "critical" indicates monitoring of an event of a failure to be dealt with immediately.

The column 403 represents the status of event subscription. For example, "subscribing" means that the device is in a first state of establishing a session with the MFP 102 and waiting for event notification from the MFP 102. "Suspended" means that the device is in a second state requiring disconnection of the session with the MFP 102 for reasons such as shutdown or sleep of the MFP 102.

The column 404 represents the date and time of suspension. The date and time of suspension indicates the date and time when the event subscription is suspended for reasons such as shutdown or sleep of the MFP 102 to be monitored. The column 405 represents a notification destination to be notified of an event of the corresponding record when the management server 101 receives the event.

FIG. 4B is an example of a device table managed by the device management service 300 of the management server 101.

The device table 410 is a table that manages information about the MFP 102 managed by the device management service 300. The device table 410 includes columns 411 to 413.

One record represents information about one MFP 102. The column 411 represents a device ID. The device ID is an identifier for uniquely identifying the MFP 102. The column 412 represents a device name. The device name is a display name of the MFP 102 and is used when the name is displayed on the UI. The column 413 represents an IP address of the MFP 102.

FIG. 4C is an example of an event log table managed by the event management unit 354 of the MFP 102.

The event log table 450 is a table that manages information about events that have occurred in the MFP 102. The event log table 450 includes columns 451 to 455.

One record represents information about one event. The column 451 represents an event ID. The event ID is an identifier for uniquely identifying an event. The column 452 represents the date and time of occurrence of an event. The column 453 represents an event class. The event class indicates whether the event that has occurred is an event of a failure or an event of a state transition of the MFP 102. For example, "Fault" indicates an event of failure occurrence.

The column 454 represents the severity of a failure in a case where the event that has occurred is an event of the failure. For example, "critical" indicates an event of a failure to be dealt with immediately. The column 455 represents the contents of the event. For example, "TONER_EMPTY" indicates that toner of the MFP 102 has run out.

FIG. 4D is an example of a notification condition table managed by the event management unit 354 of the MFP 102.

The notification condition table 460 is a table that manages a notification condition of an event. The notification condition table 460 includes columns 461 to 464. A notification condition of an event is created by a request for registering event subscription from the device management service 300. Processing of registering event subscription will be described below with reference to FIG. 6.

One record represents a notification condition of one event. The column 461 represents a notification condition ID. The notification condition ID is an identifier for uniquely identifying a notification condition. The column 462 represents the severity of a failure that the management server 101 is to be notified of in a case where the failure occurs (where a failure event occurs). For example, "critical" indicates that, in a case where the severity of a failure event that has occurred is "critical", the management server 101 is notified of the event.

The column 463 represents a state transition that the management server 101 is to be notified of in a case where the state of the MFP 102 changes (where a state transition event occurs). For example, "sleep" indicates that, in a case where the MFP 102 transitions to the sleep state, the management server 101 is notified of the transition. The column 464 represents an IP address of a notification destination to be notified of an event when the event has occurred.

UI of Device Management Service 300

Figure 5:
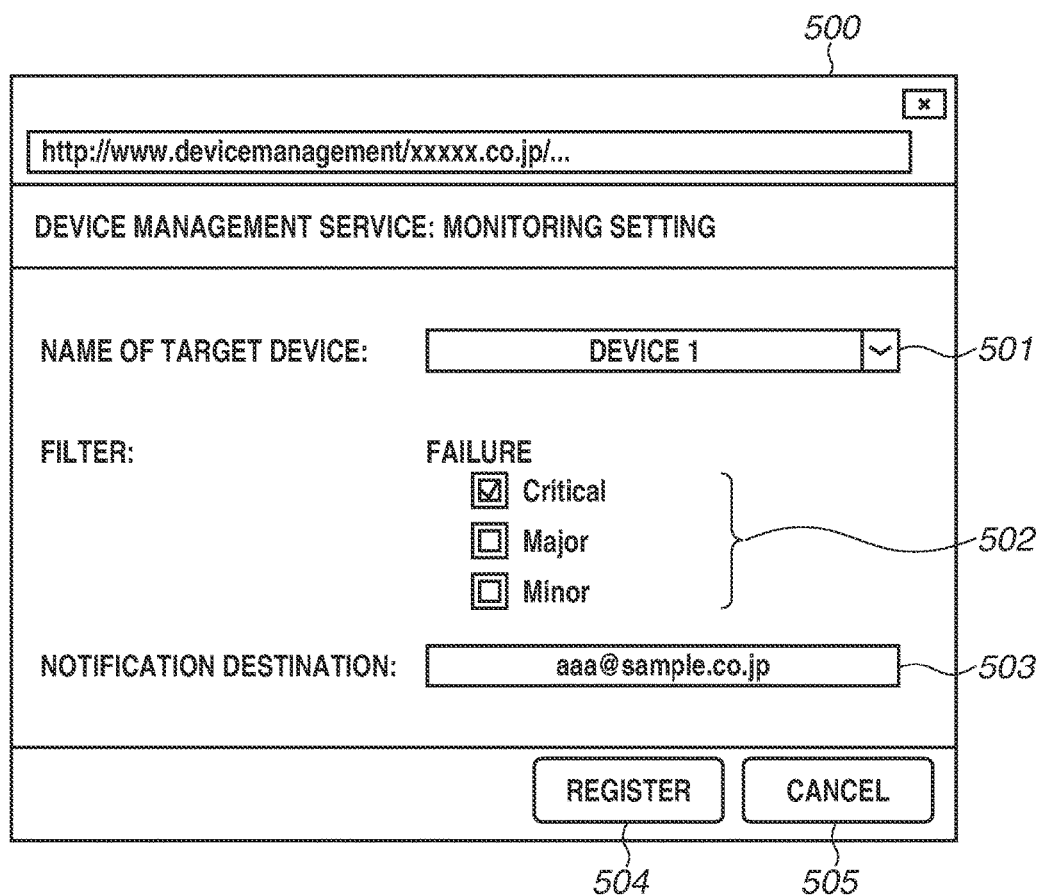
FIG. 5 is a diagram illustrating an example of a user interface (UI) of a device management service.

FIG. 5 is an example of a UI (screen) provided by the UI unit 301 of the device management service 300.

A UI 500 is displayed when a uniform resource locator (URL) of the device management service 300 is accessed through a web browser of a user's computer. The UI 500 is a UI for performing monitoring setting, and includes controls (501 to 505) such as buttons and text boxes.

A combo box 501 is a combo box for selecting the MFP 102 to be monitored. A check box 502 is a check box for selecting the severity (importance) of a failure to be monitored. A text box 503 is a text box for setting a notification destination (mail address) to be notified of an event that has occurred in the MFP 102 by e-mail when the event is received. A button 504 is a button for registering the contents set by the controls (501 to 503) as monitoring settings. Processing performed after the device management service 300 detects pressing of the button 504 will be described with reference to FIGS. 6 to 8. A button 505 is a button for discarding the monitoring setting edited on the UI 500.

Processing of Event Notification

Processing from when the device management service 300 detects pressing of the button 504 for registering the monitoring setting on the UI 500 until notifying the event will be described with reference to FIGS. 6 to 8.

Figure 6:
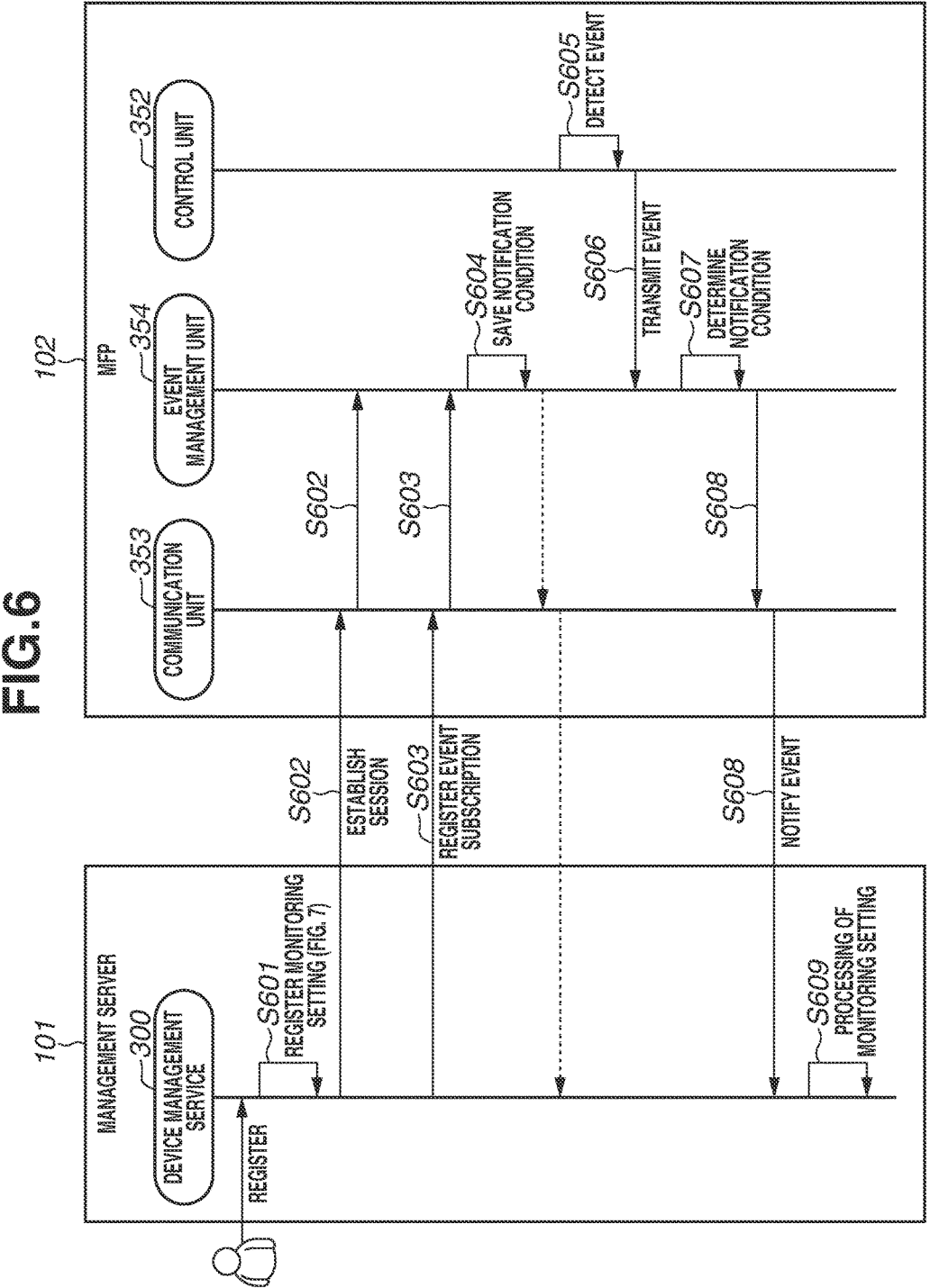
FIG. 6 is a diagram illustrating processing from registration of event subscription to event notification.

FIG. 6 is a sequence diagram illustrating processing of the management server 101 and the MFP 102 from when the device management service 300 detects pressing of the button 504 on the UI 500 until notifying the event.

In step S601, the monitoring setting management unit 303 of the device management service 300 receives the contents set on the UI 500 via the communication unit 305. The monitoring setting management unit 303 registers the received contents in the monitoring setting table 400. Details of the processing in step S601 will be described with reference to FIG. 7.

Figure 7:
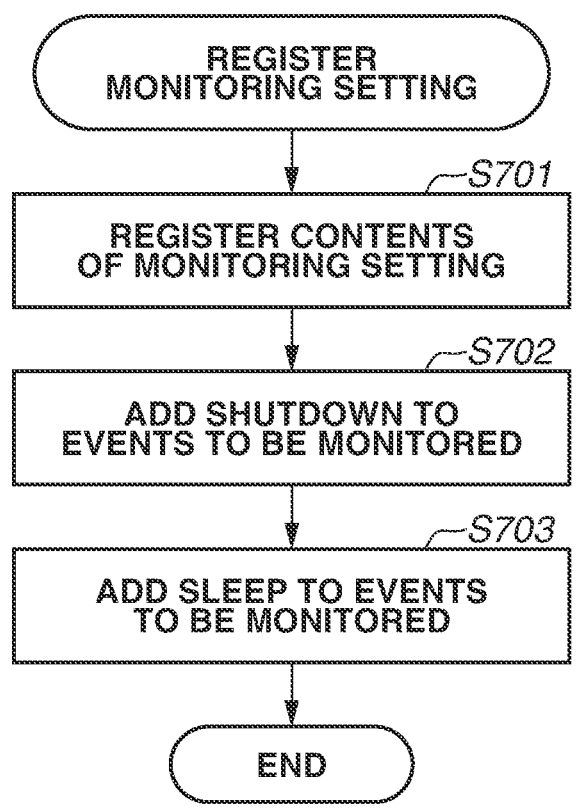
FIG. 7 is a flowchart illustrating processing of registering a notification setting of the device management service.

FIG. 7 is a flowchart illustrating processing in which the monitoring setting management unit 303 of the device management service 300 registers a monitoring setting.

In step S701, the monitoring setting management unit 303 registers, in the monitoring setting table 400, the contents of the monitoring setting set on the UI 500. In step S702, the monitoring setting management unit 303 adds an event indicating a transition to shutdown to the events to be monitored, in addition to the contents of the monitoring setting set on the UI 500. By thus setting the event indicating the transition to shutdown as an event to be monitored, the device management service 300 can receive the event indicating the state transition of the MFP 102 to shutdown.

In step S703, the monitoring setting management unit 303 adds an event indicating sleep to the events to be monitored, in addition to the contents of the monitoring setting set on the UI 500. By thus setting the event indicating sleep as an event to be monitored, the device management service 300 can receive the event indicating the state transition of the MFP 102 to the sleep state. Through the processing in steps S702 and S703, the device management service 300 can recognize that the MFP 102 has transitioned to a state in which the session cannot be maintained.

Reference is made again to the description of FIG. 6. In step S602, the communication unit 305 of the device management service 300 establishes a session with the event management unit 354 via the communication unit 353 of the MFP 102. The session is established using protocols such as the secure shell (SSH) protocol and the transport layer security (TLS) protocol that can handle a connection-oriented session.

In step S603, the monitoring setting management unit 303 of the device management service 300 registers the event subscription of NETCONF in the MFP 102 via the communication unit 305. The communication in step S603 is performed using the session established in step S602. Hereinafter, the contents of registration of the event subscription of NETCONF to be transmitted in the processing of step S603 will be described with reference to FIG. 8.

FIG. 8 is a diagram illustrating a display example of the contents of registration of the event subscription of NETCONF to be transmitted to the MFP 102 by the device management service 300.

Registered contents 800 include Extensible Markup Language (XML). A <filter> tag 801 represents what kind of event the user wishes to be notified of from the MFP 102. The events specified in the <filter> tag 801 are notified from the MFP 102. <event> tags 802 to 804 each represent one of the events the user wishes to be notified of from the MFP 102. The <event> tag 802 indicates that an event of a failure with the severity "critical" is to be notified. The <event> tag 803 indicates that an event of a state transition to shutdown is to be notified. Note that the contents of the <event> tag 803 include those added by the processing of step S702. The <event> tag 804 indicates that an event indicating a transition to the sleep state is to be notified. Note that the contents of the <event> tag 804 include those added by the processing of step S703.

Reference is made again to the description of FIG. 6. In step S604, the event notification unit 357 of the event management unit 354 included in the MFP 102 registers the contents of the event subscription received in step S603 in the notification condition table 460 as a notification condition. The registration of the event subscription is completed by the processing up to step S604. The subsequent processing indicates processing in a case where an event occurs in the MFP 102. When an event occurs, the MFP 102 determines whether to notify the device management service 300 of the event with reference to the notification condition saved in the processing up to step S604.

Hereinafter, processing in which the MFP 102 notifies an event will be described. In step S605, when the control unit 352 of the MFP 102 detects an event, the processing proceeds to step S606. In step S606, the control unit 352 transmits the event that has occurred to the event reception unit 355 of the event management unit 354. The event recording unit 356 of the event management unit 354 registers, in the event log table 450, the contents of the event received by the event reception unit 355.

In step S607, the event notification unit 357 of the event management unit 354 determines whether the event received in step S606 is an event that the device management service 300 is to be notified of. Specifically, the event notification unit 357 acquires the notification condition from the notification condition table 460, compares the event received in step S606 with the notification condition in the notification condition table 460, and determines whether the received event is an event to be notified.

For example, according to the notification condition with the notification condition ID "N001", in a case where the event received in step S606 is a "critical" failure or a state transition to sleep or shutdown, the MFP 102 determines to notify the event. In a case where the event notification unit 357 determines that the event is to be notified, the processing proceeds to step S608.

In a case where the event notification unit 357 determines that the event is not to be notified, on the other hand, the event management unit 354 waits until the next event is received. In step S608, the event notification unit 357 notifies the device management service 300 of the event that has occurred via the communication unit 353. In step S609, the monitoring setting management unit 303 of the device management service 300 notifies the notification destination registered in column 405 of the monitoring setting table 400 of the contents of the event by e-mail.

Transition to State in which Session cannot be Maintained

Next, processing performed when an event indicating a transition to a state (second state) in which a session cannot be maintained occurs in the MFP 102 will be described with reference to FIGS. 9 and 10.

Figure 9:
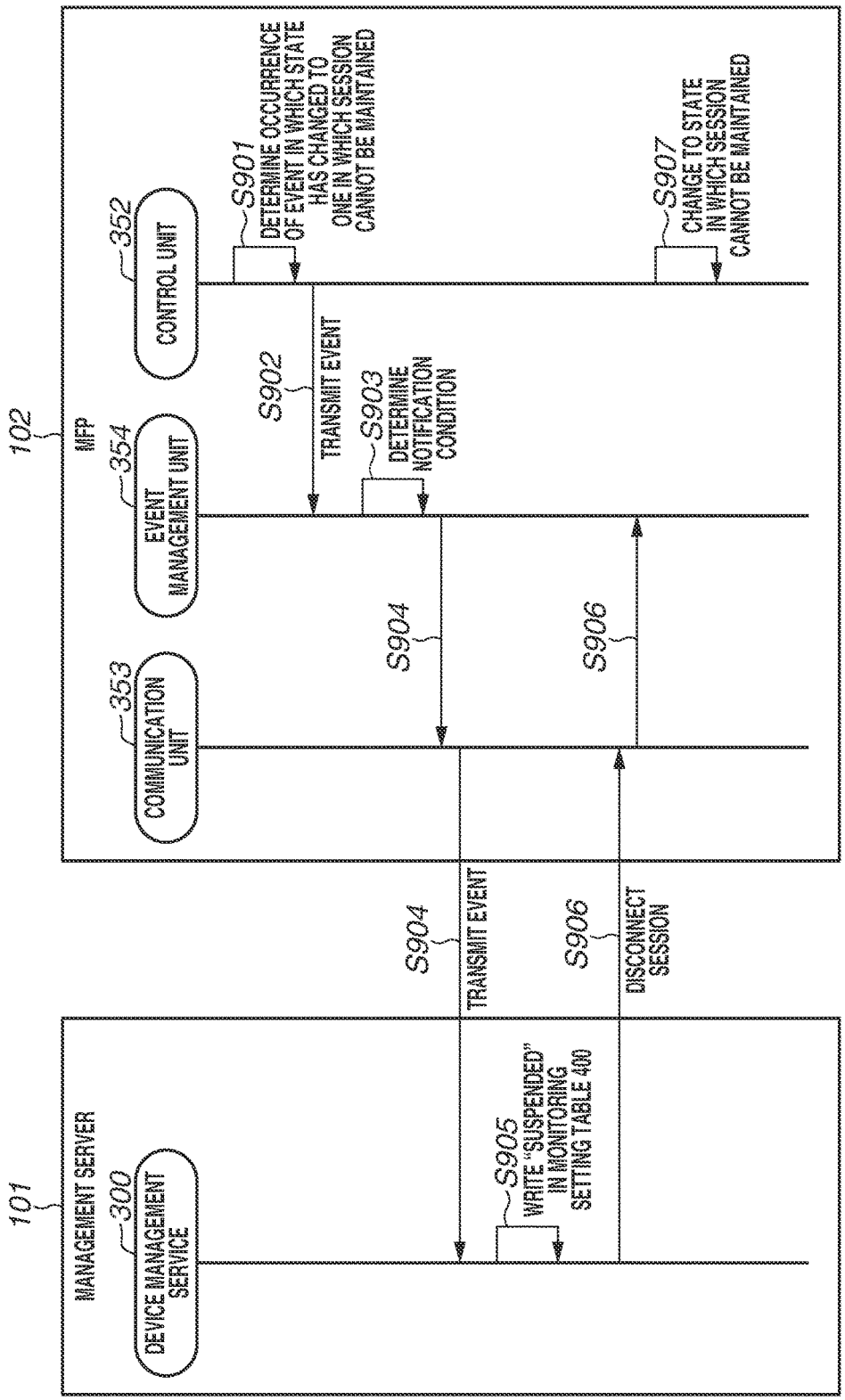
FIG. 9 is a diagram illustrating processing at the time of a transition to a state in which a session cannot be maintained.

FIG. 9 is a sequence diagram illustrating processing of the MFP 102 and the management server 101 when an event indicating a transition to a state in which a session cannot be maintained occurs.

In step S901, the control unit 352 of the MFP 102 determines whether an event indicating a transition to a state in which a session cannot be maintained has occurred. In a case where the control unit 352 determines that the event indicating the transition to the state in which the session cannot be maintained has occurred, the processing proceeds to step S902. The state in which the session cannot be maintained is, for example, shutdown (power off) or a sleep state. The state transition to shutdown can be determined based on, for example, whether the UI unit 351 has accepted a shutdown operation. Hereinafter, processing in which the control unit 352 determines the state transition to sleep in step S901 will be described with reference to FIG. 10.

FIG. 10 is a flowchart illustrating the processing in which the control unit 352 of the MFP 102 determines the state transition to sleep.

In step S1001, the control unit 352 determines whether the operation has been suspended for a predetermined time. In a case where the operation has been suspended for the predetermined time (YES in step S1001), the processing proceeds to step S1002. In a case where the operation has been performed (NO in step S1001), on the other hand, the control unit 352 continues monitoring.

In step S1002, the control unit 352 inquires of the communication unit 353 about whether the established session only includes a session of event subscription of NETCONF. In a case where the session only includes a session of event subscription of NETCONF (YES in step S1002), the control unit 352 determines the state transition to sleep, and the processing proceeds to step S902. In a case where the session is not only event subscription of NETCONF (NO in step S1002), on the other hand, the processing returns to step S1001 and continues monitoring.

The MFP 102 cannot maintain a session when the state transitions to sleep. Therefore, in a case where there is a session, the MFP 102 may be configured not to transition to the sleep state by prioritizing communication with another device. In the present exemplary embodiment, therefore, the MFP 102 is configured to transition to sleep in a case where the session only includes the event subscription of NETCONF. As a result, the MFP 102 can transition to the sleep state even during the event subscription of NETCONF.

Reference is made again to the description of FIG. 9. In step S902, the control unit 352 transmits the event to the event reception unit 355 of the event management unit 354. The event recording unit 356 of the event management unit 354 registers, in the event log table 450, the information about the event received by the event reception unit 355. In step S903, the event notification unit 357 of the event management unit 354 determines whether the event received in step S902 is an event that the device management service 300 is to be notified of, similarly to the processing of step S607.

In a case where the event notification unit 357 determines that the event is to be notified, the processing proceeds to step S904. Note that in the example illustrated in FIG. 9, it is assumed that the event received in step S902 is an event indicating a transition to a state such as shutdown or sleep in which a session cannot be maintained. The monitoring setting set on the UI 500 is registered such that the device management service 300 is always notified of the event of the state transition to shutdown or sleep by the processing of steps S702 and S703.

Therefore, the event notification unit 357 determines that an event (first notification) indicating the transition to a state such as shutdown or sleep in which a session cannot be maintained is an event that the device management service 300 is sure to be notified of. In the present exemplary embodiment, the monitoring setting is registered such that the device management service is always to be notified of the event of the state transition to shutdown or sleep in the processing of steps S702 and S703, but the present invention is not limited to this method. For example, when the event management unit 354 of the MFP 102 saves the contents of the event subscription received in step S603 as a notification condition in step S604, shutdown and sleep may be added as events to be notified.

In step S904, the event notification unit 357 of the event management unit 354 notifies the device management service 300 of the event that has occurred via the communication unit 353. That is, the management server 101 receives, from the MFP 102, the first notification indicating the transition from the first state in which a session for event notification between the MFP 102 and the management server 101 is established to the second state in which it is necessary to disconnect the session.

The event received in step S904 is an event indicating the transition to a state in which the session cannot be maintained. Therefore, in step S905, the monitoring setting management unit 303 of the device management service 300 registers the current date and time in the column 404 of the monitoring setting table 400. It is thus possible to record the date and time when the event subscription is suspended.

In step S906, the communication unit 305 of the device management service 300 disconnects the session with the event management unit 354 via the communication unit 353 of the MFP 102. In the present exemplary embodiment, the device management service 300 of the management server 101 disconnects the session with the MFP 102. Alternatively, the event management unit 354 of the MFP 102 may disconnect the session via the communication unit 353. In step S907, the control unit 352 of the MFP 102 executes a transition to the event determined to have occurred in step S901, that is, the state such as shutdown or sleep in which the session cannot be maintained.

Returning to State in which Session can be Established

Next, processing performed when an event of returning to a state in which a session can be established occurs in the MFP 102 will be described with reference to FIGS. 11 and 12.

FIG. 11 is a sequence diagram illustrating processing of the MFP 102 and the management server 101 when an event of returning to a state (first state) in which a session can be established occurs.

In step S1101, the control unit 352 of the MFP 102 determines whether an event of returning to a state in which a session can be established has occurred. In a case where the control unit 352 determines that the event of returning to the state in which a session can be established has occurred, the processing proceeds to step S1102. For example, the control unit 352 determines that the event of returning to the first state in which a session can be established has occurred, when the power is turned on in the shutdown state or the UI unit 351 is operated in the sleep state.

In step S1102, the control unit 352 transmits the event to the event reception unit 355 of the event management unit 354. The event recording unit 356 of the event management unit 354 registers, in the event log table 450, the information about the event received by the event reception unit 355. In step S1103, the event notification unit 357 of the event management unit 354 notifies the device management service 300 of the return via the communication unit 353.

That is, the management server 101 receives, from the MFP 102, a second notification indicating the transition (return) from the second state in which it is necessary to disconnect a session for event notification between the MFP 102 and the management server 101 to the first state in which the session is established. Note that at the time of executing step S1103, the MFP 102 has not established a session with the device management service 300. Therefore, the return notification is performed using the simple network management protocol (SNMP) trap or informRequest.

In step S1104, the monitoring setting management unit 303 of the device management service 300 checks whether the monitoring setting for the MFP 102 that has transmitted the return notification in step S1103 is suspended. In a case where the monitoring setting is suspended, the processing proceeds to step S1105 to resume the event subscription. In a case where the monitoring setting is not suspended, on the other hand, the device management service 300 does not perform the processing in and after step S1105. In step S1105, the communication unit 305 of the device management service 300 establishes a session with the event management unit 354 of the MFP 102 via the communication unit 353 of the MFP 102.

In step S1106, the monitoring setting management unit 303 of the device management service 300 reregisters the event subscription of NETCONF in the MFP 102 via the communication unit 305. The communication in step S1106 is performed using the session established in step S1105.

The event management unit 354 of the MFP 102 registers the contents of the event subscription received in step S1106 in the notification condition table 460 as a notification condition.

FIG. 12 is a diagram illustrating a display example of the registered contents of the event subscription of NETCONF to be transmitted to the MFP 102 by the device management service 300.

Note that in the example illustrated in FIG. 12, the event subscription registered in step S603 (FIG. 8) is reregistered (resumed) in the MFP 102. Here, the difference from the contents of the event subscription described in FIG. 8 will be described.

The difference between registered contents 1200 and the registered contents 800 (FIG. 8) is that a <startTime> tag 1201 is added to the registered contents 1200. The <startTime> tag 1201 is a tag indicating the time to start subscribing to an event that has occurred. The time set in the <startTime> tag 1201 is the date and time when the event subscription is suspended and is the information stored in column 404 of the monitoring setting table 400.

That is, the device management service 300 sets the date and time when the event subscription is suspended stored in the column 404, as time information used for determining an event to be notified from among the events matching the notification condition in the notification condition table 460. As a result, it is possible to subscribe to an event that has occurred in the MFP 102 after the date and time when the event subscription is suspended.

Note that in the present exemplary embodiment, the date and time when the event subscription is suspended is set in the <startTime> tag 1201, but the present invention is not limited to this setting. For example, time between the time when the event subscription is suspended and the time before the reception of the return notification may be set in the tag.

Reference is made again to the description of FIG. 11. In step S1107, the event notification unit 357 of the event management unit 354 included in the MFP 102 acquires all the events that have occurred after the date and time designated by the <startTime> tag 1201 via the event recording unit 356. In step S1108, similarly to the processing in step S607, the event notification unit 357 of the event management unit 354 compares the event acquired in step S1107 with the notification condition in the notification condition table 460, and determines whether the acquired event is an event to be notified.

In a case where the event notification unit 357 determines that the event is to be notified, the processing proceeds to step S1109. In a case where the event notification unit 357 determines that the event is not to be notified, on the other hand, the event management unit 354 waits until the next event is received. In step S1109, the event notification unit 357 notifies the device management service 300 of the event that has occurred via the communication unit 353.

In step S1110, the monitoring setting management unit 303 of the device management service 300 notifies the notification destination registered in the column 405 of the monitoring setting table 400 of the contents of the event by e-mail, similarly to the processing in step S609. In this way, an event that occurs after the date and time when the event subscription is suspended is to be notified at the time of resuming the event subscription. As a result, the device management service 300 can manage all the events.

Processing at Time of Unexpected Session Disconnection

As described above, in the present exemplary embodiment, the MFP 102 notifies the device management service 300 of the management server 101 of the transition to a state such as shutdown or sleep in which a normal session cannot be maintained. Meanwhile, processing performed by the device management service 300 in a case where a session is disconnected for an unexpected reason, such as when the MFP 102 is inadvertently unplugged, will be described below.

Figure 13:
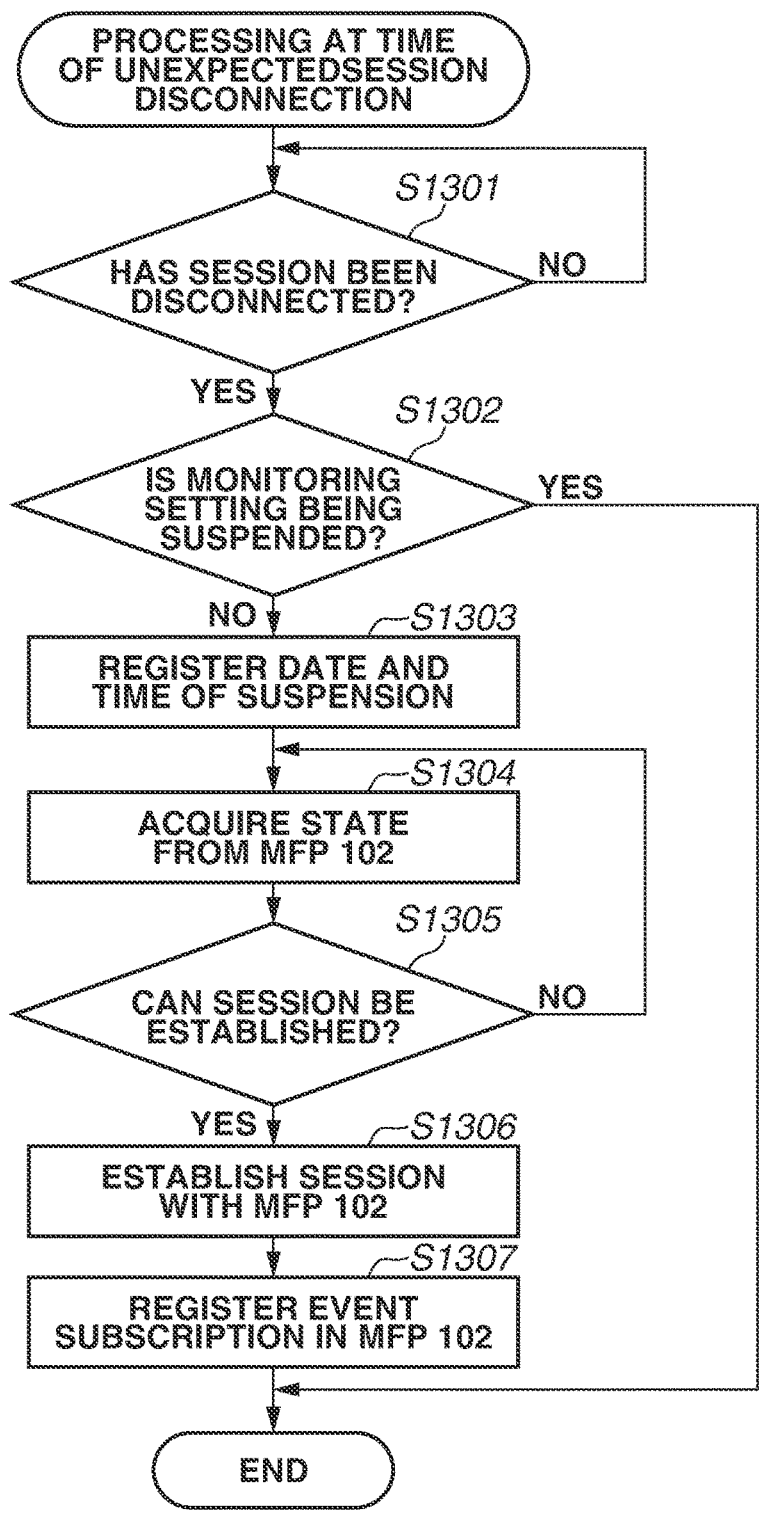
FIG. 13 is a flowchart illustrating processing at the time of unexpected session disconnection.

FIG. 13 is a flowchart illustrating processing performed by the device management service 300 of the management server 101 in a case where a session is disconnected for an unexpected reason.

In step S1301, the communication unit 305 of the device management service 300 monitors whether a session has been disconnected. In a case where the session has been disconnected (YES in step S1301), the processing proceeds to step S1302. In a case where the session has not been disconnected (NO in step S1301), on the other hand, the communication unit 305 continues monitoring.

In step S1302, the monitoring setting management unit 303 of the device management service 300 determines whether the monitoring setting of the MFP 102, in which the session has been disconnected in step S1301, has been suspended. In a case where the monitoring setting has not been suspended (NO in step S1302), the processing proceeds to step S1303. In a case where the monitoring setting has been suspended (YES in step S1302), it is determined that the monitoring has been suspended by receiving an event such as sleep or shutdown from the MFP 102, and the processing in FIG. 13 is ended.

In step S1303, the monitoring setting management unit 303 determines that the monitoring setting of the MFP 102, in which the session has been disconnected in step S1301, has been suspended. Specifically, the monitoring setting management unit 303 registers the current date and time in the column 404 (date and time of suspension) of the monitoring setting table 400. In step S1304, the control unit 302 of the device management service 300 acquires the state from the MFP 102 via the communication unit 305.

In step S1305, the control unit 302 determines whether the acquired state of the MFP 102 is a state in which a session can be established. In a case where the control unit 302 determines that the MFP 102 is in a state in which a session can be established (YES in step S1305), the processing proceeds to step S1306. In a case where the control unit 302 determines that the MFP 102 is not in the state in which a session can be established (NO in step S1305), or the control unit 302 cannot acquire the state of the MFP 102 in step S1304, the processing returns to step S1304.

In steps S1304 and S1305, the control unit 302 polls the state of the MFP 102. As a result, the device management service 300 determines whether the MFP 102 has returned to a state in which a session can be established. When the device management service 300 acquires the state of the MFP 102 while the MFP 102 is in the sleep state, the MFP 102 returns from the sleep state. In the present exemplary embodiment, however, the device management service 300 is configured to receive an event from the MFP 102 upon the state transition to sleep.

Therefore, when the MFP 102 is in the sleep state, the processing in steps S1304 and S1305 is not performed. Therefore, the MFP 102 is not unnecessarily returned from the sleep state just to perform the event subscription. This makes it possible to keep low power consumption of the MFP 102. In step S1306, the communication unit 305 of the device management service 300 establishes a session with the event management unit 354 of the MFP 102 similarly to the processing of step S1105.

In step S1307, the monitoring setting management unit 303 of the device management service 300 registers the event subscription of NETCONF in the MFP 102 via the communication unit 305, similarly to the processing of step S1106. The event subscription has been registered herein. Thus, in a case where an event occurs in the MFP 102 thereafter, the device management service 300 of the management server 101 is notified of the event.

As described above, according to the present exemplary embodiment, a management apparatus can manage all the events that have occurred in a network device such as the MFP 102 even in a case where the network device transitions to a state in which it is necessary to suspend the session with the management apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-197617, filed Oct. 5, 2016, which is hereby incorporated by reference herein in its entirety.

What is claimed is:

1. A management apparatus that manages a network device using a predetermined protocol via a network, the management apparatus comprising:
a memory storing instructions; and
a processor which is capable of executing the instructions causing the management apparatus to:
register, in the network device, designation of a condition under which the network device is to notify the management apparatus of an event;
receive, from the network device, a first notification indicating that a state of the network device transitions from a first state in which a session enabling the event notification between the network device and the management apparatus is established to a second state in which the session needs to be disconnected;

receive, from the network device, a second notification indicating that the state of the network device returns to the first state; and re-register the designation of the condition in the network device in response to reception of the second notification, wherein, in the re-registration in response to the reception of the second notification, time from a time of receiving the first notification to a time before receiving the second notification is set as time information used for determining an event to be notified from among events matching the condition.

2. The management apparatus according to claim 1, wherein the predetermined protocol is NETCONF.

3. The management apparatus according to claim 1, wherein a plurality of datastores of the network device used in the predetermined protocol includes, in addition to a running datastore, at least one of a candidate datastore and a startup datastore.

4. The management apparatus according to claim 1, wherein, in the re-registration in response to the reception of the second notification, a suspension time at which processing related to the event notification using the session is suspended in response to the reception of the first notification is set as the time information.

5. The management apparatus according to claim 4, wherein the instructions cause the management apparatus to store the suspension time.

6. The management apparatus according to claim 5, wherein the instructions cause the management apparatus to acquire, from the network device, the state of the network device by conducting polling one or more times until the network device returns to the first state, in a case where the session is suspended and the suspension time is not stored.

7. The management apparatus according to claim 1, wherein the second state is a state in which the network device is in a sleep state or turned off.

8. The management apparatus according to claim 1, wherein the condition includes designation of an event indicating the transition to the second state.

9. The management apparatus according to claim 1, wherein the condition includes an importance level of each event.

10. A control method for a management apparatus that manages a network device using a predetermined protocol via a network, the control method comprising:

registering, in the network device, designation of a condition under which the network device is to notify the management apparatus of an event;

receiving, from the network device, a first notification indicating that a state of the network device transitions from a first state in which a session enabling the event notification between the network device and the management apparatus is established to a second state in which the session needs to be disconnected;

receiving, from the network device, a second notification indicating that the state of the network device returns to the first state; and re-registering the designation of the condition in the network device in response to reception of the second notification, wherein, in the re-registration in response to the reception of the second notification, time from a time of receiving the first notification to a time before receiving the second notification is set as time information used for determining an event to be notified from among events matching the condition.

11. A non-transitory computer readable storage medium on which is stored a computer program for making a computer execute a control method for a management apparatus that manages a network device using a predetermined protocol via a network, the control method comprising:

registering, in the network device, designation of a condition under which the network device is to notify the management apparatus of an event;

receiving, from the network device, a first notification indicating that a state of the network device transitions from a first state in which a session enabling the event notification between the network device and the management apparatus is established to a second state in which the session needs to be disconnected;

receiving, from the network device, a second notification indicating that the state of the network device returns to the first state; and re-registering the designation of the condition in the network device in response to reception of the second notification, wherein, in the re-registration in response to the reception of the second notification, time from a time of receiving the first notification to a time before receiving the second notification is set as time information used for determining an event to be notified from among events matching the condition.

* * * * *